Figure 1:
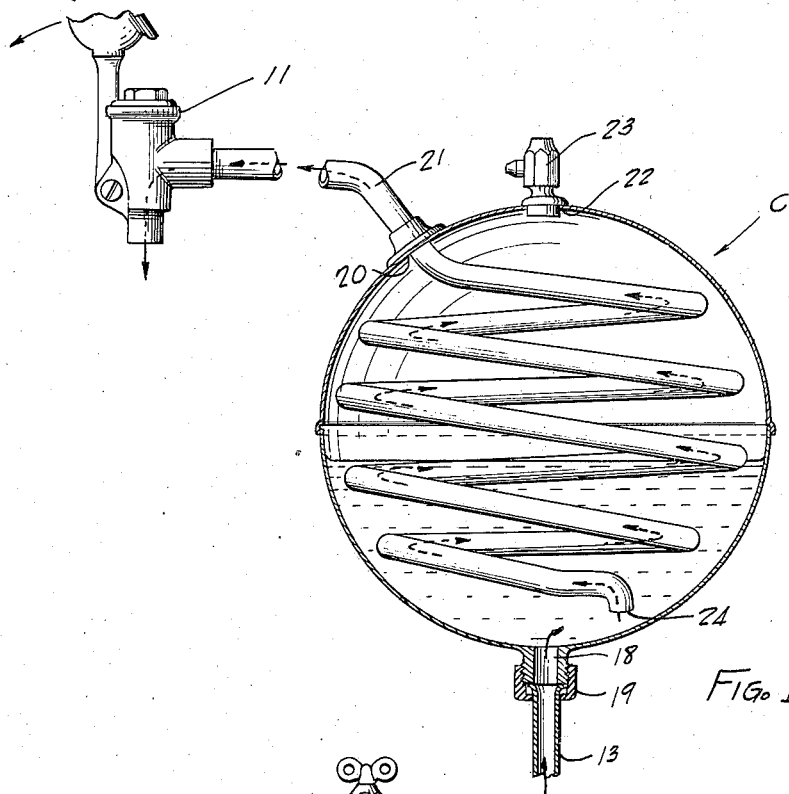

March 14, 1939. F. W. HESS 2,150,655
CARBONATED BEVERAGE FLOW CONTROL
Filed Sept. 24, 1937 2 Sheets-Sheet 1

INVENTOR.
FREDERICK WILBUR HESS
BY Joshua H Potts
ATTORNEY.

March 14, 1939.　　　　F. W. HESS　　　　2,150,655

CARBONATED BEVERAGE FLOW CONTROL

Filed Sept. 24, 1937　　　2 Sheets-Sheet 2

INVENTOR.
FREDERICK WILBUR HESS.
BY Joshua R H Potts
ATTORNEY.

Patented Mar. 14, 1939

2,150,655

UNITED STATES PATENT OFFICE 2,150,655

CARBONATED BEVERAGE FLOW CONTROL

Frederick Wilbur Hess, Haddonfield, N. J.

Application September 24, 1937, Serial No. 165,434

2 Claims. (Cl. 225—9)

This invention has to do with the art of dispensing carbonated beverages, and is concerned primarily with apparatus which is designed to dispense a beverage such as beer in a properly saleable condition.

Beer includes as a characteristic element carbon dioxide gas, and in the dispensing of this beer it is important that this gaseous content be properly controlled and maintained in the beer, because when the beer loses the gas it becomes flat and assumes generally an undesirable condition. It is now substantially the universal practice for the breweries to sell beer in barrels that take the size of a keg or half keg, and these barrels ordinarily are stored in cellars or other places beneath the bar from which the beer is to be disposed of commercially, and gas pressure is availed of to raise the beer from the barrel to the point where it is dispensed. This gas pressure is usually the natural gas pressure of the beer itself, but as the kegs become emptied it may be supplemented by supplying additional gas under a required degree of temperature.

With the now known types of apparatus employed for the dispensing of beer, the turning on of a faucet inevitably leads to a certain amount of pulsation in the flow of the beer. This is due to the fact that when the faucet is turned on the pressure of the faucet is zero, and the beer through the entire line from the barrel is released and feels the effect of the pressure in the barrel.

With these conditions it is impossible to obtain an even and uniform flow of the beer, particularly when it is borne in mind that gas and air pockets form in the beer with the pulsating results. When beer is dispensed through the faucet in this condition it is in at least a partially wild state, and causes excess foaming, which is, of course, undesirable as to the saleable quality of the beer.

With the foregoing conditions in mind this invention has in view as its foremost objective the provision of beer dispensing apparatus which includes as an essential element a so-called gas entrapment chamber which is disposed substantially as close as permissible to the dispensing faucet. This gas entrapment chamber is directly in communication with the source of beer supply (a keg in the basement) and as the beer is admitted into the chamber from the source of supply the air therein and the gases from the beer itself are entrapped in the upper part of the chamber until it equals the pressure of the beer. This pressure of the beer in the chamber will be substantially the same as that of the barrel minus the pressure required to raise the beer, and also less the force necessary to overcome frictional resistance which, up to this point, is kept at minimum.

An important feature of the present invention is the drawing off of the beer from this gas entrapment chamber to the faucet under the influence of the gas pressure in the chamber. This objective is obtained by having a beer conduit open closely adjacent to the bottom of the entrapment chamber containing the beer and extending to the faucet. When the faucet is turned on the pressure of the beer will force the beer through the conduit to be dispensed in the manner desired.

Inasmuch as the pressure at the faucet will be zero, it is important that this conduit take the form of a resistance coil so that flow of the beer in the conduit may be in a properly controlled state.

With the foregoing arrangement it is evident that any air or gas pockets in the beer line between the keg and the entrapment chamber will be dissipated in the air entrapment chamber, and as the tubular conduit from the chamber to the faucet is a small fraction of the entire extent of the beer conducting conduits the liability of this interrupted or pulsating flow of beer is reduced to a minimum.

Various other more detailed objects and advantages of the invention will in part become apparent and in part be hereinafter stated.

The invention, therefore, comprises beer dispensing apparatus which includes as a characteristic element a gas entrapment chamber which receives beer from a source of supply to build up gas pressure in the chamber which is availed of as a means for forcing beer from the chamber to a dispensing faucet.

Figure 2:
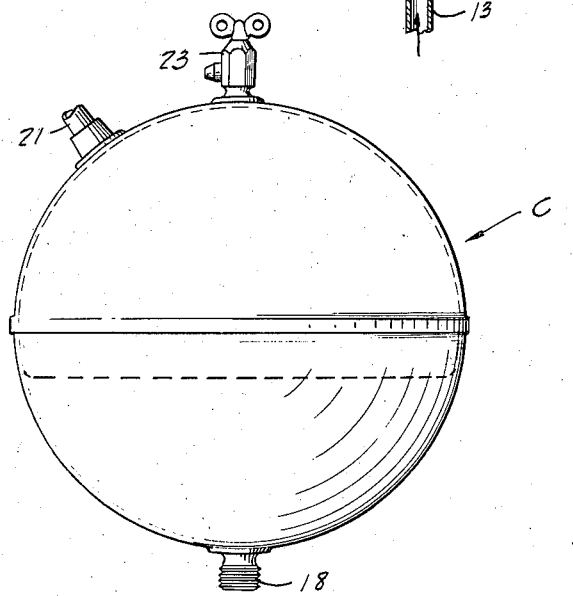

For a full and more complete understanding of the invention reference may be had to the following description and accompanying drawings, wherein Figure 1 is a section through an air entrapment chamber designed in accordance with the precepts of this invention. In this view the beer dispensing faucet is shown in elevation and the connection thereto broken away, Figure 2 is an elevational showing of the chamber shown in Figure 1, and Figure 3 is a side view somewhat diagrammatic of a beer dispensing system including the chamber shown in Figures 1 and 2.

Figure 3:
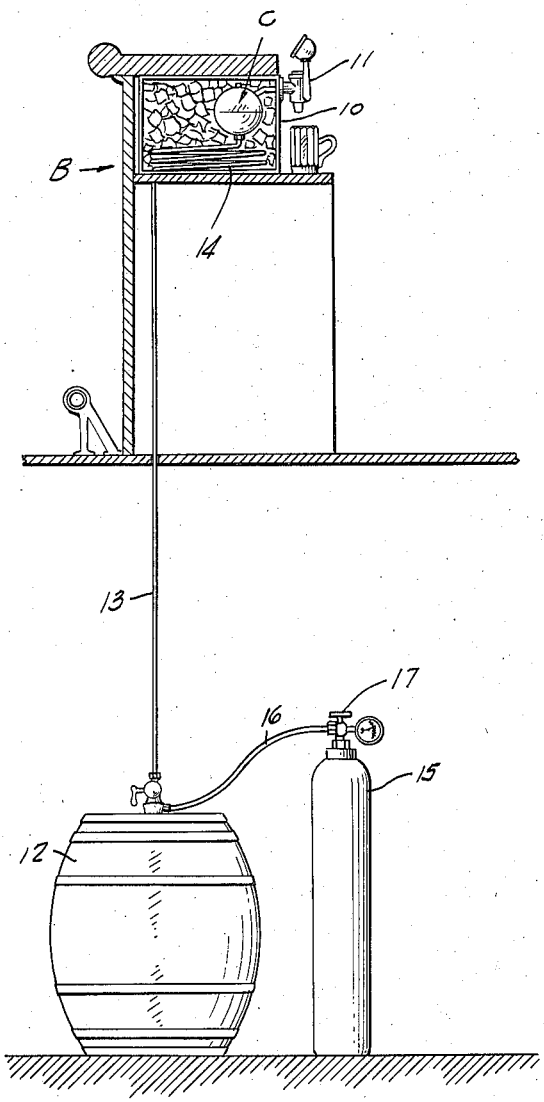

Referring now to the drawings, and more particularly to Figure 3, an ordinary bar from which beer is sold commercially is referred to generally by the reference character B. Disposed beneath the bar B is a refrigerating tank 10 which may include any appropriate refrigerant which is maintained at a required temperature either by electrical refrigerating apparatus or ice.

Disposed within this tank 10 is the gas entrapment chamber of the present invention, which is referred to in its entirety by the reference character C. It is notable at this point that the bar B includes a dispensing faucet 11 at a conveniently accessible position which is carried by a wall of the tank 10.

A source of beer supply is illustrated in this Figure 3 as taking the form of a keg 12 which is connected by a beer supply line 13 to the chamber C in a manner hereinafter described in detail. Between that point where the supply conduit 13 enters the tank 10 and the chamber C the conduit preferably is formed with a plurality of turns to define a coil 14 which is immersed in the refrigerant of the tank 10 and thus serves to cool the beer to a properly desired point. A source of supply of gas under pressure is shown at 15 as being connected to the keg 12 by a line 16. The valvular control represented at 17 may be availed of to obtain a required degree of pressure in the keg 12 as occasion demands.

Referring now more particularly to Figures 1 and 2, the chamber C is illustrated as being spherical in formation, although this is in no way intended to be a limitation upon the invention, as the chamber may assume any convenient shape. At its lowermost portion the chamber C is provided with a beer inlet port 18 which is connected with the beer supply line 13 by the coupling represented at 19.

At a convenient point in the upper zone of the chamber C there is formed an opening 20 through which extends a tubular conduit 21 that is connected to the faucet 11. This conduit 21 extends through the opening 20 into the chamber C, and is coiled about to define turns so that it may assume sufficient length to properly constitute a required resistance coil. The length of these resistance coils will vary under the conditions of different installations, but generally it will be somewhere between two to three feet, and this length may readily be contained within the chamber C.

At its uppermost point the chamber C is provided with a vent at 22 which normally is closed by the petcock represented at 23. This vent is only opened when the apparatus is to be flushed for cleaning purposes.

Briefly describing the operation of the foregoing apparatus it is noted that pressure in the beer in the keg 12 will be controlled in accordance with the temperature of the keg. Purely for purposes of illustration we will assume that the pressure of this beer in the keg is about 22 pounds, which is an average condition.

This pressure will force the beer upwardly through the supply conduit 13 through the coils 14 through the inlet port 18 into the chamber C. As the beer enters the chamber C air and gas coming from the beer will be entrapped in the upper part of the chamber, and the pressure thereof gradually built up until it substantially equals the pressure of the incoming beer; that is it will be equal to the pressure of the beer in the barrel minus that which is necessary to lift the beer from the keg to the chamber C, and also the force necessary to overcome the frictional resistance of the line 13.

At this point it is well to note that this invention contemplates an arrangement wherein the frictional resistance up to the tank C will be kept at a minimum. Thus the pressure of the entrapped gas within the chamber C will be something less than 18 pounds.

It is noted that the free end of the conduit 21 is located in spaced relation from the bottom of the chamber C, as represented at 24. The pressure of the entrapped gas will cause the entire conduit to contain beer right up to the faucet 11. When this faucet 11 is turned on the pressure thereof will have been reduced to zero, and the pressure of the entrapped gas in the chamber C is effective to force the beer through the conduit 21 in the manner intended, and this conduit 21 is so designed as to constitute a resistance coil whereby the beer will be dispensed through the faucet 11 under slight, if any, pressure, to provide a uniform even flow of the beer.

Ordinarily the vent 23 is maintained closed so that the gas will be properly entrapped. However, when the apparatus is to be flushed out for cleaning purposes, this vent will be opened so that the cleaning fluid may obtain access to all points of the chamber C. Otherwise the pressure in the entrapped gas may interfere with the cleaning operations.

While a preferred specific embodiment of the invention is hereinbefore set forth it is to be clearly understood that I am not to be limited to the exact construction illustrated and described, because various modifications of these details may be provided in putting the invention into practice within the purview of the appended claims.

I claim:

1. In beer dispensing apparatus, a gas entrapment chamber comprising a casing formed with an inlet port at the lowermost portion of the casing, said casing having an opening in its upper portion, and a resistance coil passing through said opening and having a free end disposed adjacent to and spaced from the bottom of the casing, the turns of said resistance coil being disposed within the said casing.

2. In beer dispensing apparatus, a gas entrapment chamber comprising a spherically shaped casing element formed with an inlet port in its lowermost zone, and an opening removed from said inlet port, a resistance coil disposed in said casing and having a free end spaced from the casing adjacent to its bottom, said coil extending through said opening that is removed from the inlet port, said casing also being formed with a vent, and means for closing the vent.

FREDERICK WILBUR HESS.